US 7,849,629 B1

(12) United States Patent
Adcock

(10) Patent No.: US 7,849,629 B1
(45) Date of Patent: Dec. 14, 2010

(54) AUTOMATIC FISH HOOK SETTER APPARATUS AND METHOD

(76) Inventor: Michael R. Adcock, 27290 Cove Dr., Orange Beach, AL (US) 36561

( * ) Notice: Subject to any disclaimer, the term of this patent is extended or adjusted under 35 U.S.C. 154(b) by 136 days.

(21) Appl. No.: 11/983,955

(22) Filed: Nov. 13, 2007

Related U.S. Application Data

(60) Provisional application No. 60/859,068, filed on Nov. 15, 2006.

(51) Int. Cl.
A01K 91/10 (2006.01)
A01K 93/00 (2006.01)
(52) U.S. Cl. .......................................... 43/15
(58) Field of Classification Search ................ 43/15
See application file for complete search history.

(56) References Cited

U.S. PATENT DOCUMENTS

| | | | | |
|---|---|---|---|---|
| 422,331 A * | 2/1890 | Bradford | .......................... | 43/15 |
| 542,917 A * | 7/1895 | Bardsley | .......................... | 43/15 |
| 693,071 A * | 2/1902 | Ruud | .............................. | 43/15 |
| 880,045 A * | 2/1908 | Ruggles | ........................ | 43/17 |
| 975,822 A * | 11/1910 | Becker et al. | ................... | 43/16 |
| 1,255,255 A * | 2/1918 | Whalen | .......................... | 43/15 |
| 1,292,860 A * | 1/1919 | Obermiller | ..................... | 43/15 |
| 1,464,067 A * | 8/1923 | Fantz | ............................... | 43/15 |
| 1,488,838 A * | 4/1924 | Savoie | ............................ | 43/15 |
| 1,614,931 A * | 1/1927 | Pennell | ............................ | 43/15 |
| 1,816,235 A * | 7/1931 | Schroeder | ....................... | 43/15 |
| 1,866,864 A * | 7/1932 | Schroeder | ....................... | 43/15 |
| 1,989,407 A * | 1/1935 | Ezell | ................................ | 43/15 |
| 2,147,917 A * | 2/1939 | Noren | ............................. | 43/15 |
| 2,286,743 A * | 6/1942 | Ladd | ................................ | 43/15 |
| 2,295,250 A * | 9/1942 | Zenewich | ........................ | 43/15 |
| 2,481,453 A * | 9/1949 | Stadelhofer | ..................... | 43/15 |
| 2,494,800 A * | 1/1950 | Finley | ............................. | 43/15 |
| 2,530,007 A * | 11/1950 | Euzent | .......................... | 43/15 |
| 2,567,340 A * | 9/1951 | Lytle | ............................... | 43/15 |
| 2,631,399 A * | 3/1953 | Sowa | ............................... | 43/15 |
| 2,638,696 A * | 5/1953 | Derkovitz | ....................... | 43/15 |
| 2,689,426 A * | 9/1954 | Baenen | ........................... | 43/15 |
| 2,694,875 A * | 11/1954 | Hoffmann | ....................... | 43/15 |
| 2,696,692 A * | 12/1954 | Zielinski | ......................... | 43/15 |
| 2,703,465 A * | 3/1955 | Di Stefano | ...................... | 43/15 |
| 2,712,194 A * | 7/1955 | Di Stefano | ...................... | 43/15 |
| 2,726,470 A * | 12/1955 | Bass et al. | ........................ | 43/15 |
| 2,755,589 A * | 7/1956 | Osborne | .......................... | 43/15 |
| 2,799,109 A * | 7/1957 | Remington | ...................... | 43/15 |
| 2,818,671 A * | 1/1958 | Crouch | ............................ | 43/15 |
| 2,876,578 A * | 3/1959 | Argenio | .......................... | 43/15 |
| 2,898,697 A * | 8/1959 | Housman | ........................ | 43/15 |
| 2,999,328 A * | 9/1961 | Revord | ........................... | 43/17 |
| 3,001,314 A * | 9/1961 | Nahrstedt | ........................ | 43/15 |
| 3,060,615 A * | 10/1962 | Spets | ............................... | 43/15 |
| 3,162,969 A * | 12/1964 | Knott | ............................... | 43/15 |
| 3,172,224 A * | 3/1965 | Parulski | .......................... | 43/15 |
| 3,271,891 A * | 9/1966 | Hancock | .......................... | 43/15 |

(Continued)

Primary Examiner—Darren W Ark
(74) Attorney, Agent, or Firm—J. Nevin Shaffer, Jr.

(57) ABSTRACT

An automatic fish hook setter apparatus includes a trigger with a length and a center line, where the trigger includes a cocking rod hole, a tensioner hole and a line hole and where at least the cocking hole and the tensioner hole are located off of the center line. A cocking rod is connected with the cocking rod hole and a tensioner is connected with the tensioner hole.

18 Claims, 2 Drawing Sheets

U.S. PATENT DOCUMENTS

| | | | |
|---|---|---|---|
| 3,394,484 A * | 7/1968 | Sonoski | 43/16 |
| 3,766,680 A * | 10/1973 | Torme et al. | 43/16 |
| 3,771,250 A * | 11/1973 | Helmke | 43/15 |
| 3,823,501 A * | 7/1974 | Bybee | 43/15 |
| 4,124,948 A * | 11/1978 | Mautner | 43/15 |
| 4,547,990 A * | 10/1985 | Hero | 43/15 |
| 5,438,788 A * | 8/1995 | Rich et al. | 43/15 |
| 6,105,299 A * | 8/2000 | Rich | 43/15 |
| 6,493,981 B2 * | 12/2002 | Izzard | 43/15 |
| 6,966,139 B2 * | 11/2005 | Izzard | 43/15 |
| 7,124,534 B1 * | 10/2006 | Kacir | 43/15 |
| 7,152,360 B1 * | 12/2006 | Neufeld | 43/15 |
| 7,322,147 B1 * | 1/2008 | Queen et al. | 43/15 |
| 2004/0016171 A1 * | 1/2004 | Waxmanski | 43/15 |
| 2006/0064917 A1 * | 3/2006 | Cakebread | 43/15 |

* cited by examiner

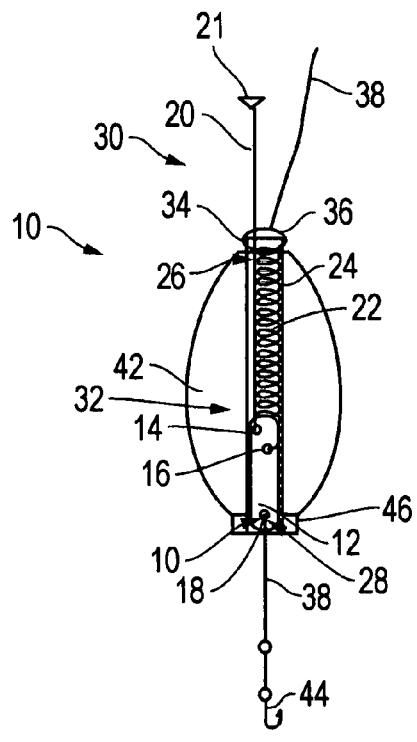
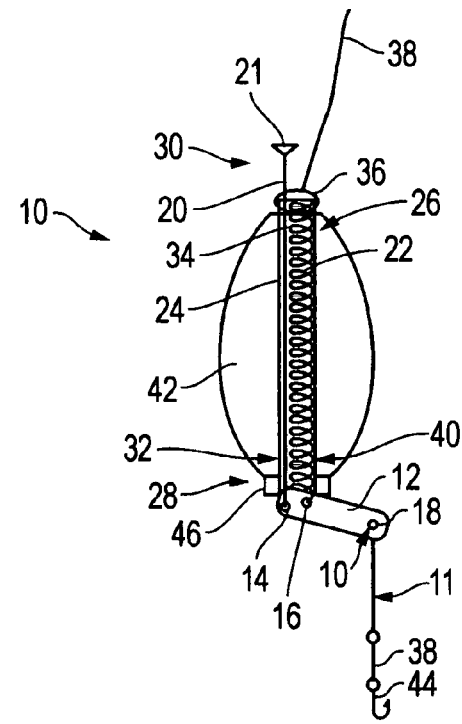
FIG. 1
FIG. 2
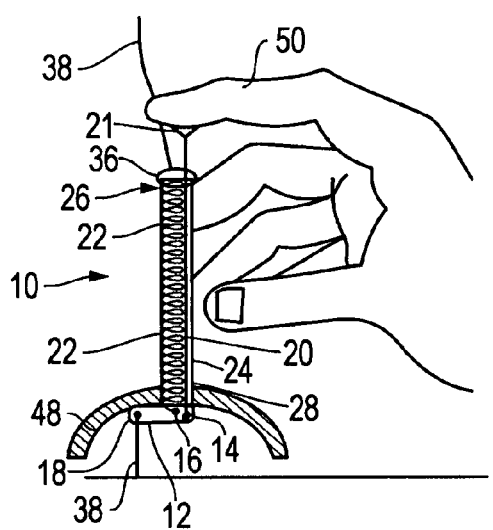
FIG. 3 ant fish hook setter apparatus and method. In particular, in accordance with one embodiment, the invention relates to an automatic fish hook setter apparatus including a trigger with a length and a center line, where the trigger includes a cocking rod hole, a tensioner hole and a line hole and where at least the cocking hole and the tensioner hole are located off of the center line. A cocking rod is connected with the cocking rod hole and a tensioner is connected with the tensioner hole.

AUTOMATIC FISH HOOK SETTER APPARATUS AND METHOD

CROSS REFERENCE TO RELATED PROVISIONAL APPLICATION

This application claims the benefit of previously filed U.S. provisional patent application No. 60/859,068 filed Nov. 15, 2006 for an "Automatic fish hook setter". The Applicant hereby claims the benefit of this provisional application under 35 U.S.C. §119. The entire contents of this provisional application is incorporated herein by this reference.

FIELD OF THE INVENTION

This invention relates to an automatic fish hook setter apparatus and method. In particular, in accordance with one embodiment, the invention relates to an automatic fish hook setter apparatus including a trigger with a length and a center line, where the trigger includes a cocking rod hole, a tensioner hole and a line hole and where at least the cocking hole and the tensioner hole are located off of the center line. A cocking rod is connected with the cocking rod hole and a tensioner is connected with the tensioner hole.

BACKGROUND OF THE INVENTION

Fishing is fun and sometimes easy if the fish are biting. The difficult thing for novices and experienced fishermen and women is to properly set the hook. At the moment a fish takes the bait, the fish is most vulnerable to being hooked. Unfortunately, inexperience and inattention often leave the hook empty and the fish fed with the bait.

The prior art includes many inventions directed to the improvement of the chances for people to catch fish. The Applicant is aware of a prior art invention for an "Automated Fishhook Tackle System" as described and disclosed in U.S. Pat. No. 6,105,299 (the "Rich" patent). The Rich patent uses a spring loaded plunger with a notch in the side and a hook attached to one end. The plunger with the hook end must be pulled until the notch in the plunger latches. An obvious difficulty with the Rich device is that it requires the user to grasp the plunger on the end where the line with a hook is tied. A further difficulty is that the device is prone to self activate when the plunger contacts something like the bottom of the fishing place or while being cast, for example, even before a fish takes the bait.

Thus, there is a need in the art for an automatic fish hook setting apparatus and method that is easy and safe to use, that may be remotely operated to ready the device for use and that is resistant to operation when cast or when coming in contact with another object such as the bottom of the place being fished. It, therefore, is an object of this invention to provide an automatic fish hook setting apparatus that may be easily and safely used by novices and experienced fishermen and women alike, that is remotely operable so that the user does not have to be concerned with hooking themselves when arming the device and that is resistant to self actuation when being cast and when coming in contact with the bottom.

SUMMARY OF THE INVENTION

Accordingly, an automatic fish hook setter apparatus, according to one embodiment, includes a trigger with a length and a center line, where the trigger includes a cocking rod hole, a tensioner hole and a line hole and where at least the cocking hole and the tensioner hole are located off of the center line. A cocking rod is connected with the cocking rod hole and a tensioner is connected with the tensioner hole.

As used herein the term "center line" has the common meaning of a line running down the center of an object. In this case the object is the trigger of the present invention. As described and discussed more fully hereafter, a key feature of Applicant's invention is the "off center" location of the cocking rod hole and the tensioner hole, one hole on either side of the center line of the trigger.

In another aspect of the invention, a cocking tube with a top and a bottom is provided where a first end of the tensioner is connected at the top of the cocking tube and a second end of the tensioner is connected with the tensioner hole in the trigger at the bottom of the cocking tube. In one aspect, a connecting ring is located at the top of the cocking tube and the first end of the tensioner is connected with the connecting ring. In another aspect, the cocking rod includes a first end and a second end and the first end of the cocking rod extends beyond the top of the cocking tube and the second end of the cocking rod is connected with the cocking rod hole in the trigger at the bottom of the cocking tube.

In a further aspect, a weight is connected with the cocking tube. In another aspect, a shroud is connected with the bottom of the cocking tube. According to one aspect, a float is connected with the cocking tube. In another aspect, the tensioner is a spring. In another aspect, the cocking rod includes a push pad.

According to another embodiment, an automatic fish hook setter apparatus includes a trigger with a length and a center line, where the trigger includes a cocking rod hole, a tensioner hole and a line hole and where at least the cocking hole and the tensioner hole are located off of the center line. A cocking rod, with a first end and a second end, is connected with the cocking rod hole and a tensioner, with a first end and a second end, is connected with the tensioner hole. A cocking tube, with a top and a bottom, is provided where the first end of the tensioner is connected at the top of the cocking tube and the second end of the tensioner is connected with the tensioner hole in the trigger at the bottom of the cocking tube and where the first end of the cocking, rod extends beyond the top of the cocking tube and the second end of the cocking rod is connected with the cocking rod hole in the trigger at the bottom of the cocking tube.

In another aspect, a connecting ring is provided at the top of the cocking tube and the first end of the tensioner is connected with the connecting ring. In another aspect, a weight is connected with the cocking tube. In one aspect, a shroud is connected with the bottom of the cocking tube. In a further aspect, a float connected with said cocking tube. In another aspect, the tensioner is a spring. In another aspect, the cocking rod includes a push pad.

According to another embodiment of the invention, an automatic fish hook setter method includes the steps of: providing a trigger with a length and a center line, where the trigger includes a cocking rod hole, a tensioner hole and a line hole and where at least the cocking hole and the tensioner hole are located off of the center line, a cocking rod connected with the cocking rod hole, and a tensioner connected with the tensioner hole; and actuating the cocking rod so as to tension the tensioner and cock the trigger.

In another aspect of the invention, the method includes the step of attaching a line with a hook to the line hole. In another aspect, the method includes the step of providing a cocking tube with a top and a bottom where the first end of the tensioner is connected at the top of the cocking tube and the second end of the tensioner is connected with the tensioner hole in the trigger at the bottom of the cocking tube and where the first end of the cocking rod extends beyond the top of the cocking tube and the second end of the cocking rod is connected with the cocking rod hole in the trigger at the bottom of the cocking tube. In another aspect, the method includes the step of providing a cocking tube with a shroud connected with the bottom of the cocking tube.

DESCRIPTION OF THE DRAWINGS

Other objects, features and advantages of the present invention will become more fully apparent from the following detailed description of the preferred embodiment, the appended claims and the accompanying drawings in which:

FIG. 1 is a side partial cut away view of the automatic fish hook apparatus of the present invention according to one embodiment showing the apparatus in the uncocked position;

FIG. 2 is a side partial cut away view of the invention of FIG. 1 showing the apparatus in the cocked position FIG. 3 is a side partial cut away view of another embodiment of the invention of FIGS. 1 and 2 showing the apparatus with a shroud and a user cocking the apparatus.

DETAILED DESCRIPTION OF THE INVENTION

Figure 4:
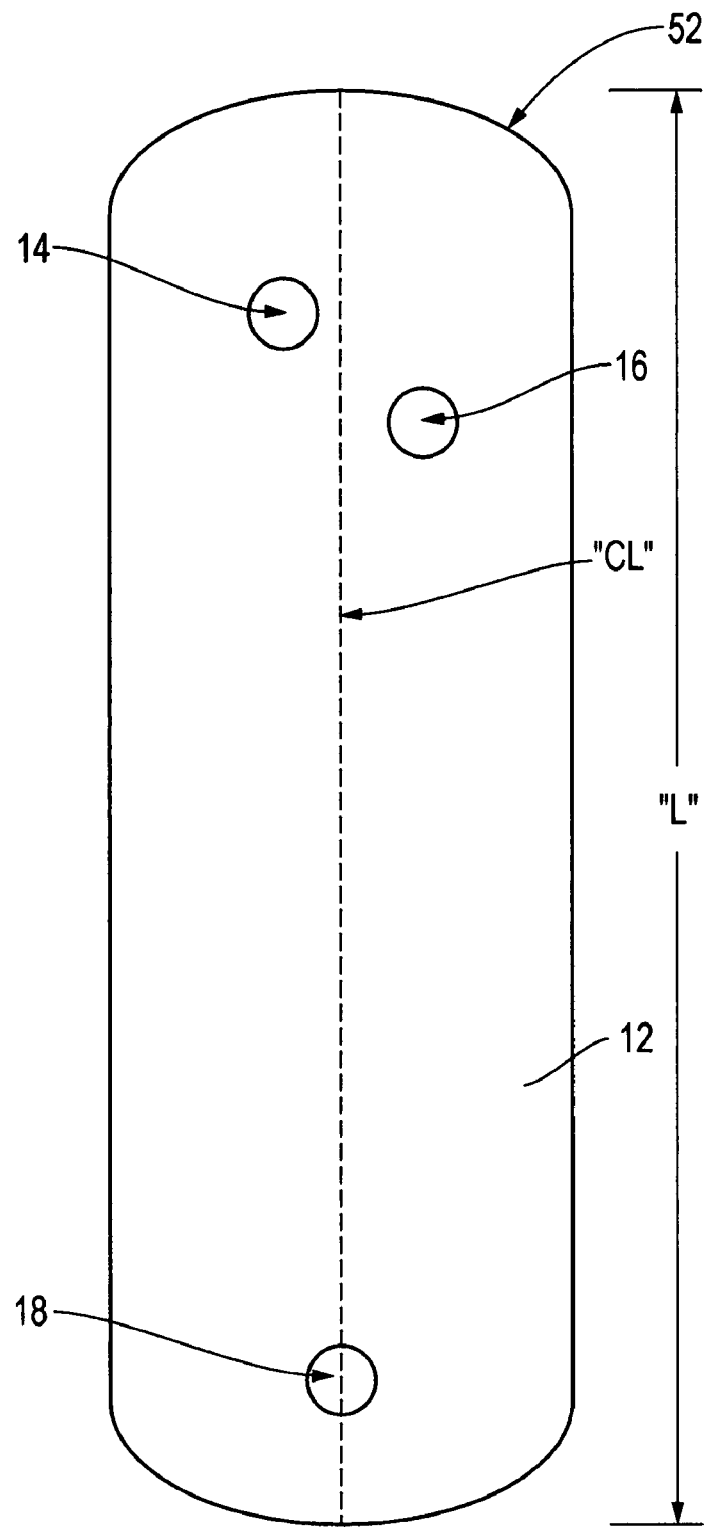
FIG. 4 is a top view of the trigger of the apparatus.

The preferred embodiment of the present invention is illustrated by way of example in FIGS. 1-4. With specific reference to FIGS. 1 and 2, according to one embodiment, an automatic fish hook setter apparatus 10 includes a trigger 14 with a length "L" and a centerline "Cl", as more clearly shown in FIG. 4. Trigger 12 includes a cocking rod hole 14, a tensioner hole 16 and a line hole 18. As illustrated, and as more easily seen in FIG. 4, cocking rod hole 14 and tensioner hole 16 are located off of, and on opposite sides of, the center line Cl of trigger 12.

FIGS. 1 and 2 also illustrate cocking rod 20 and tensioner 22. According to one embodiment, cocking tube 24 is provided. Cocking tube 24 includes a top 26 and a bottom 28. Cocking tube 24 may be made of brass or any other suitable material. As illustrated, the first end 30 of cocking rod 20 extends beyond the top 26 of cocking tube 24 and the second end 32 of cocking rod 20 is connected by cocking rod hole 14 with trigger 12 at the bottom 28 of cocking tube 24. Preferably, the first end 30 of cocking rod 20 includes a push pad 21 for use in cocking the apparatus as will be discussed more fully hereafter.

FIGS. 1 and 2 also illustrate that the first end 34 of tensioner 22 is connected to a connection ring 36 at the top 26 of cocking tube 24. Connection ring 36 passes through the top 26 of cocking tube 24 and provides a connection place for the first end 34 of tensioner 22. Connection ring 36 also provides a connection place for fishing line 38 that is attached with a fishing pole, not shown, as is known in the art. Second end 40 of tensioner 22 is connected with tensioner hole 16 in trigger 12 at the bottom 28 of cocking tube 24 as illustrated.

Still referring to FIGS. 1 and 2, other features of the invention include a float 42. Float 42 is a buoyant float designed to suspend fishing line 38 with a hook 44 connected to trigger 12 at line hole 18 from the surface of the water. Float 42 may be made of Styrofoam or any other buoyant material now known or hereafter developed. Cocking tube 24 may also include a weight 46 at the bottom 28. Weight 46 keeps cocking tube 24 oriented from top 26 to bottom 28, as shown, particularly when used in conjunction with float 42. Weight 42 may be brass, lead, steel, or any other heavy material that is non buoyant now known or hereafter developed.

FIG. 1 shows automatic fish hook setter apparatus 10 in the "uncocked" or "unarmed" position and FIG. 2 shows automatic fish hook setter apparatus 10 in the "cocked" or "armed" position. To arm the automatic fish hook setter apparatus 10, a user pushes down on push pad 21 of cocking rod 20. This creates tension in tensioner 22 which is a spring or any other elastic tensioner now known or hereafter developed. Importantly, because tensioner 22 and cocking rod 24 are connected with trigger 12 at off center tensioner hole 16 and off center cocking rod hole 14, trigger 12 is caused to pivot around center line Cl. Once trigger 12 passes the bottom 28 of cocking tube 24 it pivots as shown until it is captured by tensioner 22 in the cocked or armed position at the bottom 28. When a fish takes the hook 44 and pulls on the line 38, trigger 12 is released or moved from the bottom 28 of cocking tube 24 and tensioner 16 rapidly and forcefully retracts, thus setting the hook in a fish automatically. The device is then in the unarmed position shown in FIG. 1. Resetting the automatic fish hook setter apparatus 10 is as easy and simple as pushing down on push pad 21 as described. Advantageously, the user never has to handle trigger 12 itself or risk injury from hook 44 while cocking the Applicant's invention.

Referring now to FIG. 3, another embodiment of the invention is shown. In this embodiment, cocking tube 24 includes a shroud 48. Shroud 48 is a concave form that creates a space beneath the bottom 28 of cocking tube 24. When the user depresses push pad 21 with his or her finger 50, as shown, the invention operates as discussed above. Cocking rod 20, connected on one side of the center line Cl of trigger 12, pushes trigger down to the bottom 28 of cocking tube 24. At that point, tensioner 22, connected on the other side of centerline Cl of trigger 12, pulling up on trigger 12 causes trigger 12 to rotate, approximately ninety degrees, and to cock itself on the bottom 28. In this embodiment, shroud 48 shields trigger 12 from contact with the bottom, not shown, of the bay, lake, or ocean, for example only. As a result, shroud 48 prevents the inadvertent and unwanted setting of hook 44 by contact with something other than a fish. This enables users of Applicant's invention in this embodiment to fish the bottom since the shroud, again, prevents the operation of the device from the armed to the unarmed position except by a fish taking the hook and releasing the trigger as described.

FIG. 4, is a detailed view of the trigger 12 of the invention clearly showing the offset location of cocking rod hole 14 and tensioner hole 16. At least these two holes are off set from the center line Cl as illustrated. Line hole 18 may or may not be off set from center line Cl as desired.

By way of further explanation, to cock Applicant's automatic fish hook setter apparatus 10, a user depresses cocking rod 20, preferably by using his or her finger 50, to depress push pad 21. This causes trigger 12 to rotate approximately ninety degrees and to set itself in place as discussed in the cocked or armed position. When a fish takes the bait, not shown, the trigger is righted by tensioner 22 which pulls the trigger 12 back up, and into cocking tube 24, and causing the fish hook 44 to set into the fish's mouth, not shown. One advantage of Applicant's invention is that cocking rod 20 with push pad 21 acts to prevent a fish from pulling the device apart by pulling the cocking rod 20 out of the device. That is, the cocking rod 20 with push pad 21 is stopped at the top 26 of cocking tube 24 in the event of a vigorous fish strike.

The positioning, again of the holes in the trigger 12 are critical. Cocking rod hole 14 enables cocking rod 20, in combination with tensioner 22, to rotate trigger 12 to the cocked position because cocking rod hole 14, and tensioner hole 16, are drilled off center. When in the cocked position, tensioner hole 16 is rotated closer to center line Cl and applies approximate center line pull thus keeping trigger 12 in the cocked position. A portion of the top 52 of trigger 12 is drawn against the bottom 28 of cocking tube 24 and prevents trigger 12 from releasing from the cocked position. This also makes it less likely that the trigger 12 will release when cast.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. An automatic fish hook setter apparatus comprising:
    a. a trigger with a length and a center line, wherein said trigger includes a cocking rod hole, a tensioner hole and a line hole and wherein at least said cocking hole and said tensioner hole are located both off of said center line and on opposite sides of said center line;
    b. a cocking rod attached to said cocking rod hole;
    c. a tensioner attached to said tensioner hole; and
    d. a cocking tube with a top and a bottom wherein a first end of said tensioner is connected at the top of the cocking tube and a second end of said tensioner is connected with said tensioner hole in said trigger at the bottom of said cocking tube.

2. The apparatus of claim 1 further including a connecting ring at said top of said cocking tube and said first end of said tensioner is connected with said connecting ring.

3. The apparatus of claim 1 wherein said cocking rod includes a first end and a second end and said first end of said cocking rod extends beyond said top of said cocking tube and said second end of said cocking rod is connected with said cocking rod hole in said trigger at the bottom of said cocking tube.

4. The apparatus of claim 1 further including a weight connected with said cocking tube.

5. The apparatus of claim 1 further including a shroud connected with the bottom of said cocking tube.

6. The apparatus of claim 1 further including a float connected with said cocking tube.

7. The apparatus of claim 1 wherein said tensioner is a spring.

8. The apparatus of claim 1 wherein said cocking rod includes a push pad.

9. An automatic fish hook setter apparatus comprising:
    a. a trigger with a length and a center line, wherein said trigger includes a cocking rod hole, a tensioner hole and a line hole and wherein at least said cocking hole and said tensioner hole are located both off of said center line and on opposite sides of said center line;
    b. a cocking rod, with a first end and a second end, connected with said cocking rod hole;
    c. a tensioner, with a first end and a second end, connected with said tensioner hole; and
    d. a cocking tube with a top and a bottom, wherein said first end of said tensioner is connected at the top of the cocking tube and said second end of said tensioner is attached to said tensioner hole in said trigger at the bottom of said cocking tube and wherein said first end of said cocking rod extends beyond said top of said cocking tube and said second end of said cocking rod is attached to said cocking rod hole in said trigger at the bottom of said cocking tube.

10. The apparatus of claim 9 further including a connecting ring at said top of said cocking tube and said first end of said tensioner is connected with said connecting ring.

11. The apparatus of claim 9 further including a weight connected with said cocking tube.

12. The apparatus of claim 9 further including a shroud connected with the bottom of said cocking tube.

13. The apparatus of claim 9 further including a float connected with said cocking tube.

14. The apparatus of claim 9 wherein said tensioner is a spring.

15. The apparatus of claim 9 wherein said cocking rod includes a push pad.

16. An automatic fish hook setter method comprising:
    a. providing a trigger with a length and a center line, wherein said trigger includes a cocking rod hole, a tensioner hole and a line hole and wherein at least said cocking hole and said tensioner hole are located both off of said center line and on opposite sides of said center line, a cocking rod connected with said cocking rod hole, and a tensioner connected with said tensioner hole;
    b. providing a cocking tube with a top and a bottom, wherein said first end of said tensioner is connected at the top of the cocking tube and said second end of said tensioner is connected with said tensioner hole in said trigger at the bottom of said cocking tube and wherein said first end of said cocking rod extends beyond said top of said cocking tube and said second end of said cocking rod is connected with said cocking rod hole in said trigger at the bottom of said cocking tube; and
    c. actuating said cocking rod so as to tension said tensioner and cock said trigger.

17. The method of claim 16 further including attaching a line with a hook to said line hole.

18. The method of claim 16 further including providing the cocking tube with a shroud connected with said bottom of said cocking tube.

* * * * *